United States Patent
Hennige et al.

(10) Patent No.: US 7,790,321 B2
(45) Date of Patent: Sep. 7, 2010

(54) SEPARATOR FOR USE IN HIGH-ENERGY BATTERIES AND METHOD FOR THE PRODUCTION THEREOF

(75) Inventors: Volker Hennige, Duelmen (DE); Christian Hying, Rhede (DE); Gerhard Hoerpel, Nottuln (DE)

(73) Assignee: Evonik Degussa GmbH, Essen (DE)

( * ) Notice: Subject to any disclaimer, the term of this patent is extended or adjusted under 35 U.S.C. 154(b) by 1281 days.

(21) Appl. No.: 10/524,669

(22) PCT Filed: Jul. 4, 2003

(86) PCT No.: PCT/EP03/07163

§ 371 (c)(1),
(2), (4) Date: Feb. 11, 2005

(87) PCT Pub. No.: WO2004/021476

PCT Pub. Date: Mar. 11, 2004

(65) Prior Publication Data

US 2006/0024569 A1      Feb. 2, 2006

(30) Foreign Application Priority Data

Aug. 24, 2002   (DE)   ................. 102 38 944

(51) Int. Cl.
*H01M 2/16*      (2006.01)
*B32B 5/02*      (2006.01)
*B05D 7/02*      (2006.01)

(52) U.S. Cl. .......... 429/251; 429/252; 429/254; 427/180; 428/306.6; 428/307.7

(58) Field of Classification Search .............. None
See application file for complete search history.

(56) References Cited

U.S. PATENT DOCUMENTS

| 6,200,706 B1 * | 3/2001 | Ashida et al. ............ 429/249 |
| 6,299,668 B1 | 10/2001 | Penth et al. |
| 6,299,778 B1 | 10/2001 | Penth et al. |
| 6,309,545 B1 | 10/2001 | Penth et al. |
| 6,340,379 B1 | 1/2002 | Penth et al. |
| 6,383,386 B1 | 5/2002 | Hying et al. |
| 6,620,320 B1 | 9/2003 | Hying et al. |
| 6,841,075 B2 | 1/2005 | Penth et al. |

(Continued)

FOREIGN PATENT DOCUMENTS

DE      199 18 856      11/1999

(Continued)

*Primary Examiner*—Jonathan Crepeau
(74) *Attorney, Agent, or Firm*—Oblon, Spivak, McClelland, Maier & Neustadt, L.L.P.

(57) ABSTRACT

The present invention relates to electrical separators, especially for use in lithium high energy batteries, and to a process for making them.

Separators for use in lithium high energy batteries have to have a very low weight and a very low thickness. It has been found that, surprisingly, such separators having a weight of less than 50 g/m$^2$ and a thickness of less than 35 μm are preparable by applying a ceramic coating to a polymeric web less than 30 μm in thickness, these separators being very useful in lithium high energy batteries when pyrogenic oxides of the elements Al, Si and/or Zr are used as a particulate pore-forming component.

25 Claims, 4 Drawing Sheets

Pore size distribution

U.S. PATENT DOCUMENTS

| | | |
|---|---|---|
| 2002/0023419 A1 | 2/2002 | Penth et al. |
| 2002/0039648 A1 | 4/2002 | Horpel et al. |
| 2004/0028913 A1 | 2/2004 | Hennige et al. |
| 2004/0038105 A1 | 2/2004 | Hennige et al. |
| 2004/0262169 A1 | 12/2004 | Hying et al. |
| 2005/0031942 A1 | 2/2005 | Hennige et al. |
| 2005/0087491 A1 | 4/2005 | Hennige et al. |

FOREIGN PATENT DOCUMENTS

| | | |
|---|---|---|
| JP | 57 095071 | 6/1982 |
| JP | 08 064193 | 3/1996 |
| WO | 99 15262 | 4/1999 |

* cited by examiner

SEPARATOR FOR USE IN HIGH-ENERGY BATTERIES AND METHOD FOR THE PRODUCTION THEREOF

An electrical separator is a separator used in batteries and other arrangements in which electrodes have to be separated from each other while maintaining ion conductivity for example.

The separator is a thin porous electronically insulating material possessing high ion permeability, good mechanical strength and long-term stability to the chemicals and solvents used in the system, for example in the electrolyte of the battery. In batteries, the separator should fully electronically insulate the cathode from the anode. Moreover, the separator has to be permanently elastic and to follow movements in the system, for example in the electrode pack in the course of charging and discharging.

The separator is a crucial determinant of the use life of the arrangement in which it is used, for example a battery cell. The development of rechargeable batteries is therefore influenced by the development of suitable separator materials.

General information about electrical separators and batteries may be found for example at J. O. Besenhard in "Handbook of Battery Materials" (VCH-Verlag, Weinheim 1999).

Separators in use at present consist predominantly of porous organic polymer films or of inorganic nonwoven materials, for example nonwovens of glass or ceramic materials or else ceramic papers. These are produced by various companies. Important producers include Celgard, Tonen, Ube, Asahi, Binzer, Mitsubishi, Daramic and others. A typical organic separator consists for example of polypropylene or of a polypropylene/polyethylene/polypropylene composite.

Disadvantages of these organic polyolefin separators are their relatively low thermal stability limit of below 150° C. When used in lithium batteries as a separator, polyolefins are gradually attacked by the lithium or the lithiated graphite.

There have been initial attempts to use inorganic composite materials as separators. For instance, DE 198 38 800 encompasses an electrical separator comprising a sheetlike flexible substrate having a multiplicity of openings and having a coating on said substrate, the separator being characterized in that the material of said substrate is selected from metals, alloys, plastics, glass and carbon fiber or a combination thereof and said coating is a two-dimensionally continuous porous electrically nonconducting ceramic coating. The separators, which as exemplified are supported by electrically conductive material, however, have been determined to be unsuitable for lithium ion cells, since the coating cannot be produced over a large area without flaws at the thickness described and consequently shortcircuiting can occur very easily. In addition, the kinds of thin metal fabrics required for very thin separators are not commercially available.

We were able to show in previous work (DE 101 42 622) that this is achieved by a material comprising a sheetlike flexible substrate having a multiplicity of openings and having a coating on and in said substrate, the material of said substrate being selected from woven or non-woven electrically nonconductive fibers of glass or ceramic or a combination thereof and said coating being a porous electrically insulating ceramic coating, the resulting separator having a thickness of less than 100 µm and being bendable, having a sufficiently low resistance in conjunction with the electrolyte and yet possessing sufficiently good long-term stability.

High energy batteries are used in various applications where the decisive requirement is that a very large amount of electrical energy is available. This is the case for example with traction batteries, but also with auxiliary power systems. The amount of energy is frequently quoted in this field per unit weight [Wh/kg] or per unit volume [Wh/L]. Currently, high energy batteries reach energy levels of 350 to 400 Wh/L and 150 to 200 Wh/kg. The power levels which such batteries are expected to supply are not that high, so that compromises are possible with regard to the internal resistance. In other words, the conductivity of the electrolyte-filled separator does not have to be as large as in the case of high power batteries, for example, so that the way is open to the use of other separator designs.

High energy systems, for instance, can even utilize polymer electrolytes whose conductivity at 0.1 to 2 mS/cm is fairly low. Such polymer electrolyte cells cannot be used as high power batteries.

Separator materials for use in high energy battery systems have to have the following properties:

| | | |
|---|---|---|
| thin | → | low specific space requirements |
| light | → | low specific weight |
| very good wettability | → | or unwetted dead zones are formed |
| very safe | → | safety is very important because very large amounts of specific electrical energy are transported in these batteries. |

Many, especially mobile, applications require very large amounts of energy (eg in traction batteries). The batteries in these applications thus store large amounts of energy in the fully charged state. These energies must not in any way be released in an uncontrolled fashion in the event of a dysfunction of the battery or of an accident, since this would ineluctably lead to the cell exploding and going up in flames.

The separator described in DE 101 42 622, it is true, has a very high conductivity, but the separator described therein still does not meet the requirements of an industrially employable separator with regard to thickness, weight and safety. In DE 102 08 277, which was unpublished at the priority date of the present invention, the weight and thickness of the separator were reduced by using a polymeric nonwoven, but even the embodiments of the separator which are described therein fall short of meeting all the requirements of a separator for a lithium high energy battery, especially since the emphasis in the '277 reference was particularly placed on having a separator with very large pores. But the particles described therein, up to 5 µm in size, do not allow the fabrication of separators 10-20 µm in thickness, since only few particles would come into superposition here. As a result, the separator would inevitably have a large defect density (eg holes, cracks, . . . ). In addition, the large particles in the '277 reference consist of $Al_2O_3$ and $ZrO_2$. Owing to the high density of these ceramics, these separators have a large basis weight, reducing the mass-based specific energy density (in Wh/g).

It is accordingly an object of the present invention to provide a very light and thin separator which is simple to produce and especially suitable for use in lithium high energy batteries.

It has been found that, surprisingly, separators having a weight of less than 50 g/m² and a thickness of less than 35 µm are preparable by applying a ceramic coating to a polymeric web less than 30 µm in thickness, these separators being very useful in lithium high energy batteries.

The present invention accordingly provides a separator especially for lithium high energy batteries, comprising a sheetlike flexible substrate having a multiplicity of openings and having a porous inorganic coating on and in said substrate, the material of said substrate being selected from a nonwoven of electrically nonconductive polymeric fibers, characterized by a weight of less than 50 g/m² and a thickness of less than 35 µm.

The present invention further provides a process for producing a separator according to the present invention, which comprises providing a sheetlike flexible substrate having a multiplicity of openings with a coating on and in said substrate, the material of said substrate being selected from nonwovens less than 30 µm in thickness of electrically nonconductive fibers of polymers and said coating being a porous electrically insulating ceramic coating.

The present invention further provides for the use of an inventive separator in lithium high energy batteries and also batteries comprising an inventive separator.

The inventive separator has the advantage that it can be made particularly light and particularly thin. This is achieved by means of specific production parameters: first, by the use of a nonwoven from 5 to 30 µm and preferably from 10 to 20 µm in thickness as a support for the coating and, secondly, by the use of a specific coating slip. The nonwoven which is from 5 to 30 µm in thickness is preferably a specific wet-laid nonwoven of polyethylene terephthalate (PET) fibers which, after webbing, is calendered down to this thickness.

Figure 1:
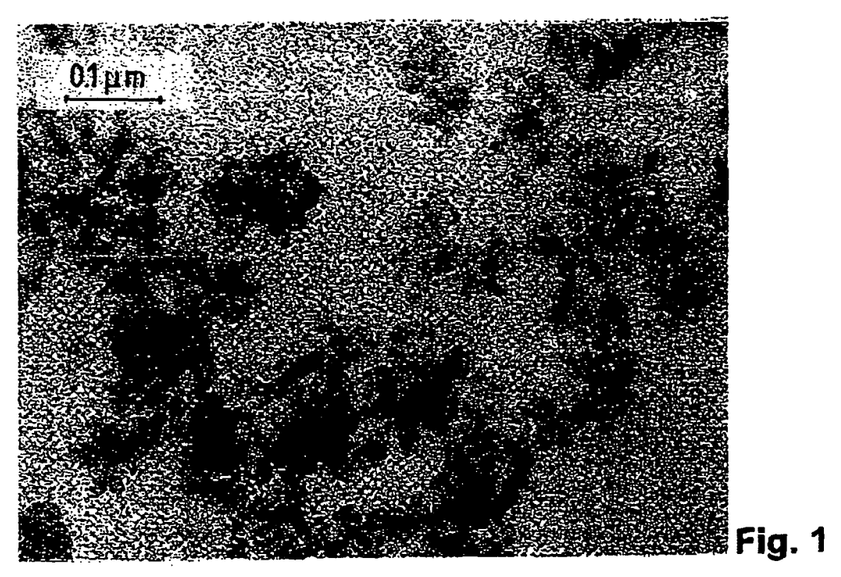
FIG. 1 shows a transmission electron micrograph of Aerosil® 200 silica from Degussa.
Figure 2:
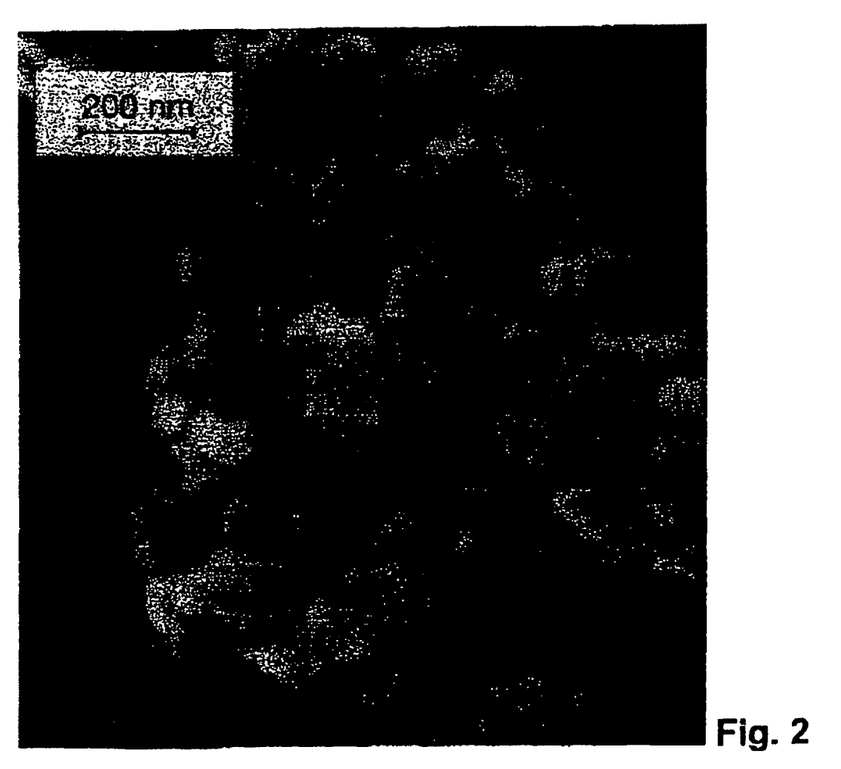
FIG. 2 illustrates a scanning electron micrograph of Aerosil® 200 silica from Degussa.

The coating is effected not with the customary coating slips as described in DE 101 42 622 or DE 102 08 277, which include large particles (up to 3-5 µm), but with slips which contain very small particles which aggregate and agglomerate to form larger structures which are fractal in some instances. This provides larger pores than would be expected given this primary particle size. It is accordingly possible to achieve, from primary particles from 7 to 50 nm in size, a coating that still has a sufficiently high porosity and pore size. Pyrogenic silica, for example Aerosil® 200 (Degussa), is such a suitable material for example. FIGS. 1 and 2 are electron micrographs of the beautiful fractal structures of these powders. Each aggregate/agglomerate is composed of many small nm-size particles. It is thereby possible to fabricate separators which are preferably 10-20 µm in thickness and have a high integrity and still a suitable pore geometry. The adhering of these particles is effected via $SiO_2$ or $ZrO_2$. These separators have not only a very large porosity but also a large secondary pore size. The very large porosity is due to the pore microstructure formed on the one hand by the primary particles (primary pores) and on the other by the "secondary" aggregates/agglomerates.

It is preferable to use $SiO_2$ as pyrogenic oxide. Since $SiO_2$ has a lower density than $Al_2O_3$ or $ZrO_2$, these separators are distinguished by a distinctly higher mass-based specific energy density.

The separator of the present invention is a hybrid separator in that it comprises inorganic components and a polymeric base material. Inherent shutdown, then, occurs with the hybrid separator of the present invention when, owing to the high temperature, the polymeric structure of the base material melts and penetrates into the pores of the inorganic material, thereby closing them. Meltdown, however, does not occur with the separator of the present invention. The separator of the present invention thus meets the requirements, voiced by various battery manufacturers, for a safety shutdown mechanism, by the shutdown in the battery cells. The inorganic particles ensure that there can never be a meltdown. It is thus ensured that there can never be a large-area short circuit.

If in addition a noninherent shutdown mechanism is absolutely necessary for practical use, this can also be achieved for example by equipping the surface and/or the pores of the ceramic or hybrid separator of the present invention with a material which, on attainment of the temperature limit, occludes the pores and prevents continued ion flux. This can be accomplished for example by means of a polymer or wax whose melting point is in that range.

The separator of the present invention is also very safe in the event of an internal short circuit due to an accident for example. If, for example, a nail were to puncture a battery, the following would happen, depending on the type of separator a polymeric separator would melt at the site of puncture (a short circuit current flows through the nail and causes it to heat up) and contract. As a result, the short circuit location would become larger and larger and the reaction could get out of control. Only the polymeric substrate material would melt in the hybrid separator of the present invention, if at all, but not the inorganic separator material. So the reaction in the interior of the battery cell following such an accident would proceed much more moderately. This battery is thus distinctly safer than one with a polymeric separator. This is an important factor in mobile applications in particular.

A further, not inconsiderable advantage of the hybrid separator of the present invention is its very good wettability. Owing to the hydrophilic ceramic coating, the wetting with electrolytes proceeds very rapidly. In the case of less hydrophilic electrolytes, however, the surface can also be made specifically more hydrophobic. This means that the batteries are quick and hence also economical to manufacture.

The separator of the present invention also has a distinct cost advantage over separators based on woven glass or ceramic fabrics as described in DE 101 42 622 for example. One reason for this, in addition to the widely disparate material costs, is that the polymeric substrate is substantially simpler to handle than woven glass or ceramic fabric, which, after all, has a certain brittleness and is destroyed by careless handling. The entire manufacturing operation for these separators from woven glass and ceramic fabrics is therefore less convenient and hence more cost intensive.

The separator of the present invention will now be described without the invention being limited thereto.

The inventive separators, especially for lithium high energy batteries, comprise a sheetlike flexible substrate having a multiplicity of openings and a porous inorganic coating on and in said substrate, the material of said substrate being selected from a nonwoven of electrically nonconductive polymeric fibers and are characterized by a weight of less than 50 g/m² and preferably less than 20 g/m² and most preferably between 10 and 20 g/m² and a thickness of less than 35 µm, preferably less than 25 µm and most preferably a thickness of 15 and 25 µm. The low thickness provides for a particularly low electrical resistance of the separator in application with an electrolyte and also a very low weight. The separator itself naturally has a very high electrical resistance, since it itself must have insulating properties.

The polymeric fiber web nonwoven serving as a substrate has a porosity which is preferably more than 50%. The porosity of the substrate is preferably in the range from 50% to 97%, more preferably in the range from 60% to 90% and most preferably in the range from 70% to 90%. Porosity in this context is defined as the volume of the nonwoven (100%) minus the volume of the fibers of the nonwoven, ie the fraction of the volume of the nonwoven that is not taken up by material. The volume of the nonwoven can be calculated from the dimensions of the nonwoven. The volume of the fibers is calculated from the measured weight of the nonwoven in question and the density of the polymeric fibers. The large porosity of the substrate also means a higher porosity for the hybrid separator of the present invention, which is why a higher uptake of electrolytes is obtainable with the separator of the present invention.

To be able to obtain a separator having insulating properties, the polymeric fibers preferably comprise fibers of polymers which are selected from polyacrylonitrile, polyester (eg PET) and/or polyolefin (PO), for example polypropylene (PP) or polyethylene (PE), or mixtures of such polyolefins. Polyolefins are preferable when they have a relatively high thermal stability. In other words, they still have to be dimensionally stable at the consolidation temperatures of the separator. The polymeric fibers are preferably from 0.1 to 10 µm and more preferably 1 to 4 µm in diameter.

The flexible substrate, especially the nonwoven, is preferably less than 30 µm, more preferably less than 20 µm and most preferably from 10 to 20 µm in thickness. The thickness of the separator has a substantial influence on the properties of the separator, since not only the flexibility but also the sheet resistance of the electrolyte-saturated separator is dependent on the thickness of the substrate. In addition, thinner separators permit an increased packing density in a battery stack, so that a larger amount of energy can be stored in the same volume. Furthermore, the limiting current density can likewise be increased as a result, through enlargement of the electrode and separator area, for a constant overall weight.

To be particularly useful in high energy batteries, it is advantageous for the separator to have a very low weight. It is therefore particularly advantageous for the nonwovens used to be less than 20 g/m², preferably less than 10 g/m² and more preferably 5 and 10 g/m² in weight.

The separator of the present invention comprises a porous electrically insulating ceramic coating. It can be advantageous for the coating which is present on and in the substrate to comprise an electrically nonconductive oxide of the elements Al, Zr and/or Si. The coating is free of the familiar large particles (average particle diameter of up to 3-5 µm), as used in customary separators or else membranes, but comprises very small primary particles which aggregate and agglomerate to form larger structures which are fractal in some instances. The particular embodiment, ie the particular way of producing the separator, provides larger pores than would be expected from the primary particle size of the oxides used. It is accordingly possible to achieve, from primary particles from 5 to 100 nm, preferably from 7 to 50 nm in size, a coating that has a high porosity and a surprisingly large pore size. The construction of the coating from relatively small primary particles, which are preferably aggregated and adhered via $SiO_2$ or $ZrO_2$, is the prerequisite for the achievement of the very thin separators of the present invention, which are preferably from 10 to 20 µm in thickness. These separators have a high integrity (ie no holes, cracks or other defects) and possess a particularly suitable pore geometry.

Preferable particles having a primary particle size from 5 to 100 nm include pyrogenic oxides such as Aerosil® from Degussa, CAB-O-SIL® from Cabot, alumina C from Degussa or other pyrogenic oxides such as pyrogenic zirconium oxide. Table 1 summarizes the pore sizes and porosities (determined by Hg porosimetry) of the ceramic components of the inventive separator from the use of differingly fine pyrogenic oxides from Degussa. The primary particle size of these oxides suggested that an average pore radius from 5 to 15 nm would be obtained.

TABLE 1

Pore radius and porosity of ceramic components of separator coatings (weight ratio of pyrogenic oxide/sol = 1/0.067; solvent: isopropanol)

| Pyrogenic oxide | Average pore radius [nm] | Porosity [%] |
| --- | --- | --- |
| Aerosil 200 | 95 | 82 |
| Aerosil 300 | 75 | 79 |
| Aerosil 380 | 72 | 75 |

The ceramic components of the separator of the present invention have a preferred porosity of more than 50%, more preferably of more than 60% and most preferably of up to 80%.

The porosity of the separator according to the present invention is preferably in the range from 30% to 80% and more preferably in the range from 50% to 70%. Porosity as understood here relates to the accessible, ie open, pores. Porosity can be determined via the familiar method of mercury porosimetry or can be calculated from the volume and the density of the materials used on the assumption that all the pores present are open pores. The coating present on and in the substrate more preferably comprises an oxide of the metals Al, Zr and/or Si.

The separators of the present invention have a breaking strength of at least 1 N/cm, preferably of at least 3 N/cm and most preferably from 3 to 10 N/cm. The separators of the present invention are preferably bendable around a radius down to 100 m, more preferably down to 50 mm and most preferably down to 0.5 mm without damage. The high breaking strength and the good bendability of the separator of the present invention has the advantage that the separator is able to follow the changes in the electrode geometry which occur in the course of battery charging and discharging without the separator being damaged. The bendability also has the advantage that this separator can be used to produce commercially standardized wound cells. In these cells, the electrode/separator plies are wound up together in spirals of standardized size and contacted.

It may be preferable for the separator to possess a noninherent shutdown mechanism. This can be achieved for example when a very thin layer of wax or polymer particles is present on or in the separator which melt at a desired shutdown temperature, so-called shutdown particles. Particularly preferred materials of construction for the shutdown particles include for example natural or artificial waxes, low-melting polymers, for example polyolefins, and the material of the shutdown particles is selected in such a way that the particles melt at the desired shutdown temperature and close the pores of the separator, preventing any further ion flux.

The shutdown particles preferably have an average particle size ($D_w$) which is not less than the average pore size ($d_s$) of the pores of the separator layer. This is particularly advantageous because this prevents penetration and closure of the pores of the inorganic layer of the separator—which would reduce the pore volume and hence the conductivity of the separator and also the performance of the battery. The thickness of the shutdown particle layer is critical only insofar as an excessively thick layer would unnecessarily increase the resistance in the battery system. To ensure safe shutdown, the shutdown particle layer should have a thickness ($z_w$) which is approximately equal to the average particle size of the shutdown particles ($D_w$) up to $10 D_w$, preferably in the range from $2 D_w$ to $D_w$. A thus equipped separator possesses a primary safety feature. But in contradistinction to the purely organic separator materials, this separator cannot completely melt and there can thus never be a meltdown. These safety features are very important because of the large energy quantities for high energy batteries and therefore are frequently stipulated.

The separator, moreover, exhibits very good wettability with polar solvents because of its hydrophilic surface. As a result, even such a thin material can still be completely wetted with electrolytes such as ethylene carbonate (EC), propylene carbonate (PC), dimethyl carbonate (DMC), etc. Polymeric separators which are more hydrophobic, such as separators composed of polypropylene (PP) or polyethylene (PE), which do not have such good wettability, can have, at these low thicknesses, regions which are not fully saturated with electrolyte and which, as dead zones, are no longer available for ion transport and so reduce the specific energy density. Owing to the markedly good wettability of the separators according to the present invention, especially and including with PC, which virtually does not wet polyolefins at all, batteries with the ceramic separator can also contain PC as a solvent for the conducting salts. Since PC has a distinctly higher boiling point and so is less combustible than, say, EC or DMC, the separators of the present invention provide a further safety advantage.

The separator of the present invention is preferably obtainable by a process for producing a separator that comprises providing a sheetlike flexible substrate having a multiplicity of openings with a coating on and in said substrate, the material of said substrate being selected from nonwovens less than 30 µm in thickness of electrically nonconductive fibers of polymers and said coating being a porous electrically insulating ceramic coating.

The coating is preferably applied to the substrate by applying to said substrate a suspension comprising at least one electrically nonconductive or only very poorly conductive oxide of the metals Al, Zr and/or Si and also a sol and heating one or more times to solidify said suspension on or in or else on and in the support. The process itself is known from WO 99/15262, but not all the parameters and starting materials, especially electrically nonconductive starting materials, can be used for producing the separator of the present invention. The choice of starting materials also dictates certain process parameters which first had to be found for the combinations of materials useful as a separator.

The suspension may be brought onto and into the substrate for example by printing on, pressing on, pressing in, rolling on, knifecoating on, spreadcoating on, dipping, spraying or pouring on.

The polymeric fibers are preferably selected from polyacrylonitrile, polyester, eg polyethylene terephthalate, and/or polyolefins. It can be preferable for the membrane of the present invention to comprise polymeric fibers having a softening temperature of above 100° C. and a melting temperature of above 150° C. It may be preferable for the polymeric fibers to be from 0.1 to 10 µm and preferably from 1 to 4 µm in diameter.

The material of the substrate is preferably selected from polymeric fiber nonwovens less than 30 µm in thickness. It may be particularly preferable to use a substrate from 5 to 30 µm and preferably from 10 to 20 µm in thickness. The nonwoven, which is preferably from 10 to 20 µm in thickness, is preferably a specific wet-laid nonwoven formed from PET fibers which, after webbing, is calendered down to this thickness. The weight of any nonwoven used is preferably less than 20 g/m$^2$, more preferably less than 10 g/m$^2$ and most preferably in the range from 5 to 10 g/m$^2$.

The suspension used for preparing the coating comprises at least one inorganic oxide of aluminum, of silicon and/or of zirconium and at least one sol of the elements Al, Zr and Si, and is prepared by suspending particles of at least one of these oxides in at least one of these sols.

The sols are obtained by hydrolyzing at least one compound of the elements Zr, Al or Si. It may be preferable to introduce the compound to be hydrolyzed into an alcohol or an acid or a combination of these liquids prior to hydrolysis. The compound to be hydrolyzed is preferably at least one nitrate, one chloride, one carbonate and/or one alkoxide compound of the elements Zr, Al and/or Si. The hydrolysis is preferably carried out in the presence of liquid water, water vapor, ice or an acid or a combination thereof.

In a further embodiment of the process of the present invention, hydrolysis of the compounds to be hydrolyzed is used to prepare polymeric sols. These polymeric sols are notable for the fact that the compounds formed by hydrolysis are present in the sol in polymeric form, ie in the form of chains crosslinked across a relatively large space. The polymeric sols customarily include less than 50% by weight and preferably much less than 20% by weight of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio of liquid water, water vapor or ice, based on the hydrolyzable group of the hydrolyzable compound. The amount of water used can be up to 10 times in the case of compounds which are very slow to hydrolyze, such as tetraethoxysilane. Compounds which are very quick to hydrolyze, such as zirconium tetraethoxide, are perfectly capable under these conditions of forming particulate sols as it is, which is why it is preferable to use 0.5 times the amount of water to hydrolyze such compounds. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols would not be very stable using an amount below this value.

To prepare these sols having the desired, very low fraction of water and/or acid in the sol, it can be advantageous for the compound to be hydrolyzed to be dissolved in an organic solvent, especially ethanol, isopropanol, butanol, acetone, hexane, cyclohexane, ethyl acetate and/or mixtures thereof, before the actual hydrolysis is carried out. A sol thus prepared can be used for preparing the suspension of the present invention.

Not just sols which are obtainable as just described can be used, but in principle also commercially available sols, for example zirconium nitrate sol or silica sol. The process of preparing separators by applying a suspension to and solidifying it on a carrier is known per se from DE 101 42 622 and in similar form from WO 99/15262, but not all the parameters and ingredients are applicable to the preparation of the membrane of the present invention. More particularly, the operation described in WO 99/15262 is not fully applicable to polymeric nonwoven materials in this form, since the very watery sol systems described therein frequently do not provide complete, in-depth wetting of the customarily hydrophobic polymeric nonwovens, since most polymeric nonwovens are only badly wetted by the very watery sol systems, if at all. It has been determined that even the minutest unwetted areas in the nonwoven material can lead to membranes or separators being obtained that have defects and hence are inutile.

Figure 3:
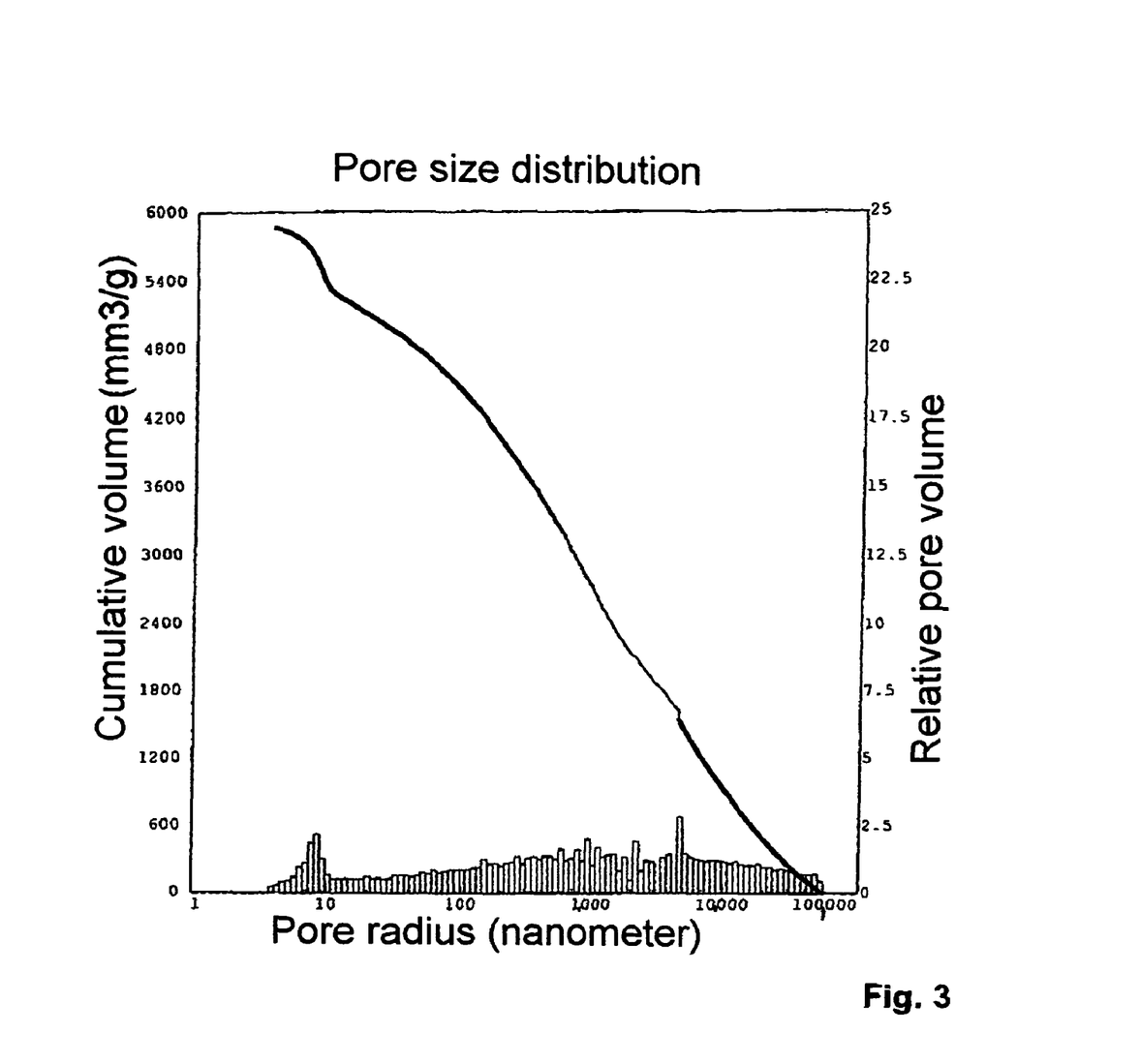
FIGS. 3 to 5 each depict diagrams in which the pore size distribution and the pore sizes have been plotted against the pore volume.
Figure 4:
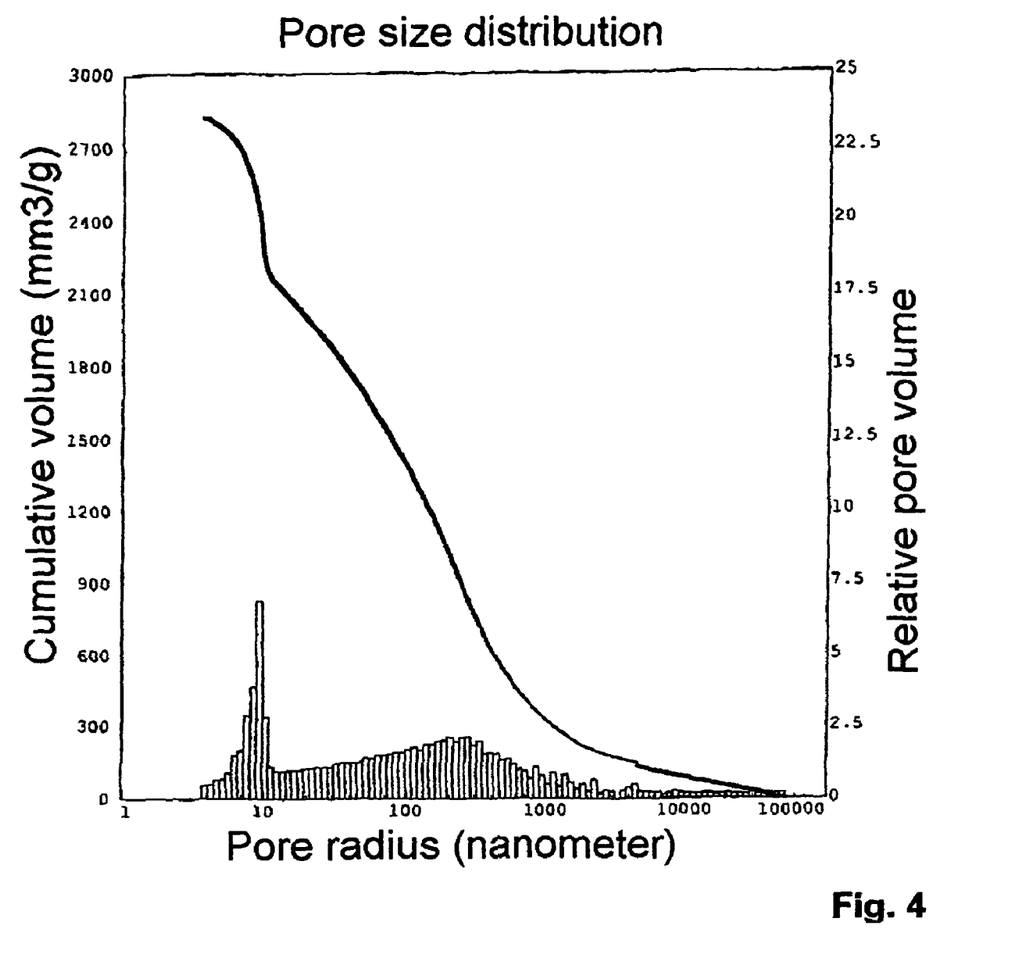
Figure 5:
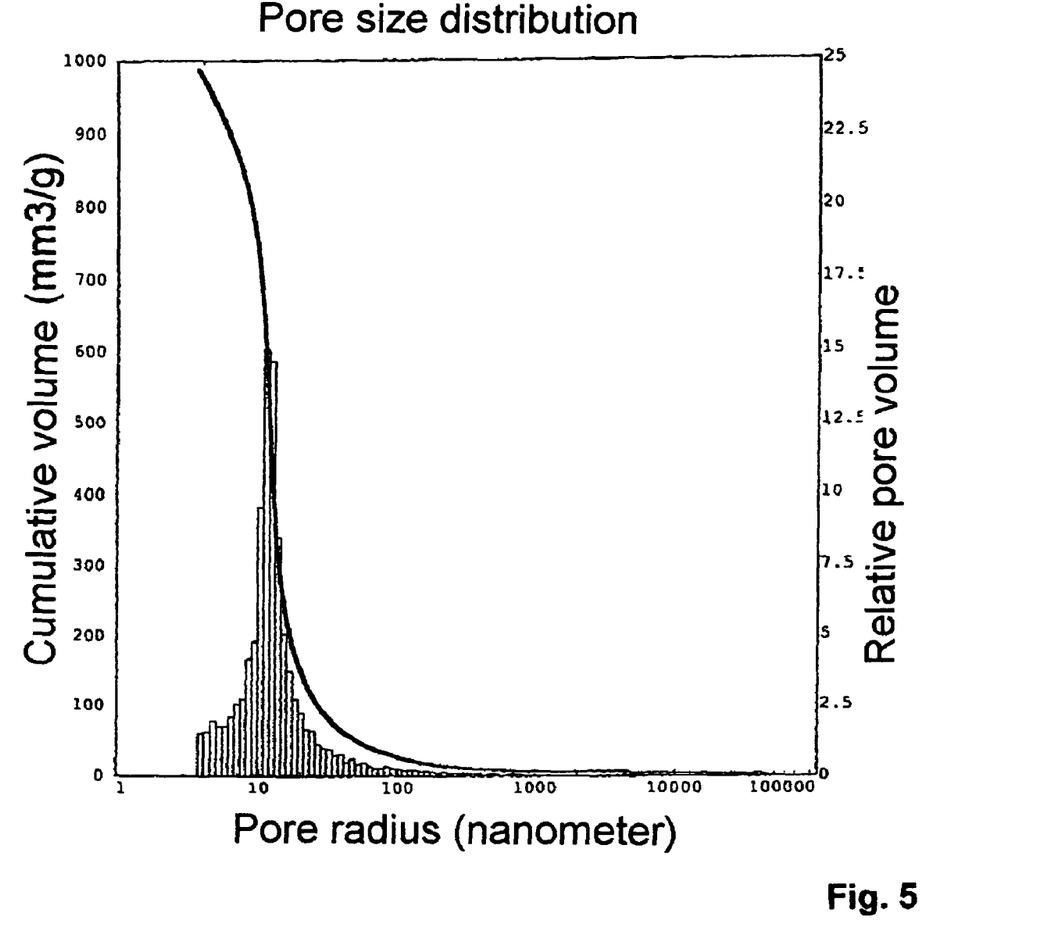

It has now been found that, surprisingly, a sol system or suspension whose wetting behavior has been adapted to the polymers will completely penetrate the nonwoven materials and so provide defect-free coatings. In the process of the present invention, it is therefore preferable to adapt the wetting behavior of the sol or suspension. This is preferably accomplished by preparing polymeric sols or suspensions from polymeric sols, these sols comprising one or more alcohols, for example methanol, ethanol or propanol, or mixtures comprising one or more alcohols and also preferably aliphatic hydrocarbons. But other solvent mixtures are also conceivable for addition to the sol or suspension in order that the wetting behavior thereof may be adapted to the substrate used. The choice of solvent influences not just the wetting behavior but also the properties of the resulting ceramic coating. The influence of the solvent on the properties of the ceramic components is shown in table 2. It is easy to see that very apolar solvents such as cyclohexane give the largest porosity and the largest average pore radii, while polar solvent (mixture of water and ethanol) gives very small pore radii and also lower porosities. The production of the ceramic layers using polar solvents and especially of cyclohexane or cyclohexane-containing mixtures is therefore particularly preferable. FIGS. 3 to 5 each show a diagram of the pore size distribution in the ceramic components of the compositions E, C and A of table 2 below.

TABLE 2

Influence of solvent on properties of ceramic components
(composition of ceramic: Aerosil 200/Levasil sol = 1/0.067 in parts by weight)

| Solvent | Average pore radius [nm] | Porosity [%] | Composition |
|---|---|---|---|
| 18 g of ethanol<br>18 g of water | 11 | 80 | A |
| 36 g of ethanol | 36 | 80 | B |
| 53 g of isopropanol | 95 | 82 | C |
| 50 g of n-butanol | 63 | 78 | D |
| 60 g of cyclohexane | 310 | 85 | E |

As mentioned, the suspension is prepared by suspending an inorganic component comprising at least one metal oxide selected from the oxides of the elements Zr, Al and Si in a sol. Preference is given to suspending an inorganic component which comprises at least one compound selected from aluminum oxide, zirconium oxide and/or silicon dioxide. The mass fraction of the suspended component is preferably from 1 to 100 times and more preferably from 1 to 50 times that of the sol used.

To obtain a sufficiently homogeneous and nearly defect-free coating in the case of the thin nonwovens used, it is preferable to suspend metal oxide particles having a primary particle size of from 5 to 100 nm and preferably from 7 to 50 nm. The particles used as having a primary particle size of from 5 to 100 nm are particularly preferably pyrogenic oxides such as Aerosil® from Degussa, CAB-O-SIL® from Cabot, alumina C from Degussa other pyrogenic oxides such as pyrogenic zirconium oxide.

To improve the adhesion of the organic components to polymeric fibers as a substrate, it may be preferable for the suspensions used to be admixed with adhesion promoters, for example organofunctional silanes. Useful adhesion promoters include in particular compounds selected from the octylsilanes, the vinylsilanes, the amine-functionalized silanes and/or the glycidyl-functionalized silanes, for example the Dynasilanes from Degussa. Particularly preferred adhesion promoters for polyethylene (PE) and polypropylene (PP) are vinyl-, methyl- and octylsilanes, although an exclusive use of methylsilanes is not optimal, for polyamides and polyamines they are amine-functional silanes, for polyacrylates and polyesters they are glycidyl-functionalized silanes and for polyacrylonitrile it is also possible to use glycidyl-functionalized silanes. Other adhesion promoters can be used as well, but they have to be adapted to the respective polymers. The WO 99/15262 addition of methyltriethoxysilane to the sol system in the coating of polymeric carrier materials is a comparatively bad solution to the adhesivity problem of ceramic on polymeric fibers. Furthermore, the drying time of from 30 to 120 min at from 60 to 100° C. in the case of the sol systems described is not sufficient to obtain hydrolysis-resistant ceramic materials. In other words, these materials dissolve or become damaged in the course of prolonged storage in aqueous media. On the other hand, the thermal treatment at above 350° C. that is described in WO 99/15262 would lead to an incineration of the polymeric nonwoven used here and hence to the destruction of the membrane. The adhesion promoters accordingly have to be selected so that the solidification temperature is below the melting or softening temperature of the polymer and below its decomposition temperature. Suspensions according to the present invention preferably include distinctly less than 25% by weight and more preferably less than 10% by weight of compounds capable of acting as adhesion promoters. An optimal fraction of adhesion promoter results from coating the fibers and/or particles with a monomolecular layer of the adhesion promoter. The amount in grams of adhesion promoter required for this purpose can be obtained by multiplying the amount in g of the oxides or fibers used by the specific surface area of the materials in $m^2g^{-1}$ and then dividing by the specific area required by the adhesion promoter in $m^2g^{-1}$, the specific area required frequently being in the order of from 300 to 400 $m^2g^{-1}$.

The table which follows contains an illustrative overview of usable adhesion promoters based on organofunctional silicon compounds for typical nonwoven material polymers.

| Polymer | Organofunctional type | Adhesion promoter |
|---|---|---|
| PAN | Glycidyl | GLYMO |
|  | Methacryloyl | MEMO |
| PA | Amino | AMEO, DAMO |
| PET | Methacryloyl | MEMO |
|  | Vinyl | VTMO, VTEO, VTMOEO |
| PE, PP | Amino | AMEO, AMMO |
|  | Vinyl | VTMO, VTEO, Silfin |
|  | Methacryloyl | MEMO | where:
AMEO=3-aminopropyltriethoxysilane
DAMO=2-aminoethyl-3-aminopropyltrimethoxysilane
GLYMO=3-glycidyloxytrimethoxysilane
MEMO=3-methacryloyloxypropyltrimethoxysilane
Silfin=vinylsilane+initiator+catalyst
VTEO=vinyltriethoxysilane
VTMO=vinyltrimethoxysilane
VTMOEO=vinyltris(2-methoxyethoxy)silane In a particular embodiment of the process according to the present invention, the abovementioned adhesion promoters are applied to the substrate, especially to the polymeric nonwoven, in a preceding step. To this end, the adhesion promoters are dissolved in a suitable solvent, for example ethanol. This solution may additionally include a small amount of water, preferably from 0.5 to 10 times the molar amount of the hydrolyzable group, and small amounts of an acid, for example HCl or HNO$_3$, as a catalyst for the hydrolysis and condensation of the Si—OR groups. This solution is applied to the substrate by the familiar techniques, for example spraying on, printing on, pressing on, pressing in, rolling on, knifecoating on, spreadcoating on, dipping, spraying or pouring on, and the adhesion promoter is fixed on the substrate by a thermal treatment at from 50 to not more than 350° C. It is only after the adhesion promoter has been applied that this embodiment of the process according to the present invention has the suspension being applied and solidified.

Application of an adhesion promoter prior to the actual application of the suspension provides improved adhesivity of the substrates especially with regard to aqueous particulate sols, which is why especially thus pretreated substrates can be coated according to the present invention with suspensions based on commercially available sols, for example zirconium nitrate sol or silica sol. But this way of applying an adhesion promoter also means that the production process of the membrane according to the present invention has to be extended to include an intervening or preliminary treatment step. This is feasible albeit more costly and inconvenient than the use of adapted sols to which adhesion promoters have been added, but also has the advantage that better results are obtained on using suspensions based on commercially available sols.

The coatings according to the invention are applied to the substrate by solidifying the suspension in and on the substrate. According to the present invention, the suspension present on and in the substrate can be solidified by heating at from 50 to 350° C. Since the maximum temperature is dictated by the substrate used when polymeric substrate materials are used, the maximum temperature must be adapted accordingly. Thus, depending upon the embodiment of the process according to the present invention, the suspension present on and in the substrate is solidified by heating at from 100 to 350° C. and most preferably by heating at from 200 to 280° C. It can be advantageous for the heating to take place at from 100 to 350° C. for from 1 second to 60 minutes. The heating preferably takes place for no more than 10 minutes and more preferably for from 0.5 to 10 minutes. It is more preferable to solidify the suspension by heating at from 110 to 300° C. and most preferably at from 200 to 280° C. and preferably for from 0.5 to 10 min. The temperature and duration of the treatment are dictated by the thermal stability of the nonwoven used as substrate and is to be adapted accordingly.

Depending on the temperature level chosen to solidify the separator, some polymer materials may undergo changes in their chemical structure under the thermal influence, so that the polymers are subsequently no longer present in their original state or modification. For instance, polyimides may partially carbonize and polyacrylonitrile may form so-called ladder polymers which subsequently undergo a partial carbonization. These effects will always lead to a change in the properties of carrier materials. This can also be specifically intended, depending on application, since, for example, the solvent, acid and alkali stability can be enhanced thereby. The degree of conversion in this context can be influenced via temperature and time.

The assembly may be heated according to the present invention by means of heated air, hot air, infrared radiation or by other heating methods according to the prior art.

The continuous process according to the present invention is preferably carried out by unrolling the substrate off a roll, passing it at a speed from 1 m/h to 2 m/s, preferably at a speed of from 0.5 m/min to 20 m/min and most preferably at a speed of from 1 m/min to 5 m/min through at least one apparatus which applies the suspension atop and into the support, for example a roller, and at least one further apparatus whereby the suspension is solidified on and in the support by heating, for example an electrically heated furnace, and rolling the separator thus produced up on a second roll. This makes it possible to produce the separator according to the present invention in a continuous process. Similarly, the pretreatment steps can be carried out on a continuous basis by observing the parameters mentioned.

The separator of the present invention may be equipped with an automatic shutdown mechanism by, for example, applying a layer of particles which, at a desired temperature, melt and close the pores of the separator, so-called shutdown particles, to the separator after the solidification of the suspension on the substrate to create a shutdown mechanism, and fixing the layer of shutdown particles. The layer of shutdown particles can be created for example by applying a suspension of wax particles having an average particle size larger than the average pore size of the separator in a sol, water, solvent or solvent mixture.

The suspension for applying the particles contains preferably from 1 to 50% by weight, more preferably from 5 to 40% by weight and most preferably from 10 to 30% by weight of shutdown particles, especially wax particles, in the suspension.

Since the inorganic coating on the separator frequently has a very hydrophilic character, it has been determined to be advantageous for the coating on the separator to be prepared using a silane in a polymeric sol as an adhesion promoter and thus be hydrophobicized. To achieve good adhesion and uniform dissipation of the shutdown particles in the shutdown layer on hydrophilic as well as hydrophobic porous inorganic separator layers, there are several possibilities.

In one version of the process according to the present invention, it has been determined to be advantageous to hydrophobicize the porous inorganic layer of the separator before the shutdown particles are applied. The production of hydrophobic membranes which works according to the same principle is described in WO 99/62624 for example. Preferably, the porous inorganic coating is hydrophobicized by treatment with alkyl-, aryl- or fluoroalkylsilanes marketed for example by Degussa under the tradename of Dynasilane. It is possible in this context to employ for example the familiar hydrophobicization methods which are employed inter alia for textiles (D. Knittel; E. Schollmeyer; *Melliand Textilber*. (1998) 79(5), 362-363), with minimal changes to the recipes, for the porous coatings on the separator as well. To this end, the coating or separator is treated with a solution which includes at least one hydrophobic material. It can be advantageous for the solvent in the solution to be water, preferably adjusted to a pH of 1-3 with an acid, preferably acetic acid or hydrochloric acid, and/or an alcohol, preferably ethanol. The solvent fraction attributable to acid-treated water or to alcohol can be in each case from 0% to 100% by volume. Preferably the fraction of the solvent which is attributable to water is in the range from 0% to 60% by volume and the fraction of solvent which is attributable to alcohol in the range from 40% to 100% by volume. The solvent has introduced into it from 0.1% to 30% by weight and preferably from 1% to 10% by weight of a hydrophobic material to prepare the solution. Useful hydrophobic materials include for example the above-recited silanes. Surprisingly, good hydrophobicization is obtained not just with strongly hydrophobic compounds such as for example triethoxy-(3,3,4,4,5,5,6,6,7,7,8,8-tridecafluorooctyl)silane, but a treatment with methyltriethoxysilane or i-butyltriethoxysilane is completely sufficient to obtain the desired effect. The solutions are stirred at room temperature to achieve uniform dissipation of the hydrophobic materials in the solution and subsequently applied to the inorganic coating on the separator and dried. Drying can be speeded by treatment at temperatures from 25 to 100° C.

In a further version of the process according to the present invention, the porous inorganic coating can also be treated with other adhesion promoters before the shutdown particles are applied. The treatment with one of the hereinbelow mentioned adhesion promoters can then likewise be effected as described above, ie by treating the porous inorganic layer with a polymeric sol which includes a silane adhesion promoter.

The layer of shutdown particles is preferably created by applying to the inorganic coating on the separator a suspension of shutdown particles in a suspension medium selected from the group consisting of a sol, water, solvents, for example alcohol, ether or ketones, and a solvent mixture and then drying. The particle size of the shutdown particles present in the suspension is arbitrary in principle. However, it is advantageous for the suspension to include shutdown particles having an average particle size ($D_w$) of not less than and preferably greater than the average size of the pores of the porous inorganic layer ($d_s$), since this ensures that the pores of the inorganic layer are not clogged by shutdown particles in the course of the production of the separator according to the present invention. The shutdown particles used preferably have an average particle size ($D_w$) which is greater than the average pore diameter ($d_s$) and less than 5 $d_s$ and more preferably less than 2 $d_s$.

To employ shutdown particles smaller in size than the pores of the porous inorganic layer, the particles must be prevented from penetrating into the pores of the porous inorganic separator layer. Reasons for employing such particles include for example large price differences, but also availability. One way of preventing the penetration of shutdown particles into the pores of the porous inorganic layer is to control the viscosity of the suspension in such a way that absent external shearing forces no penetration of the suspension into the pores of the inorganic layer on the separator takes place. Such a high viscosity for the suspension is obtainable for example by adding auxiliaries which influence the flow behavior, for example silicas (Aerosil, Degussa), to the suspension. When auxiliaries are used, for example Aerosil 200, a fraction from 0.1% to 10% by weight and preferably from 0.5% to 50% by weight of silica, based on the suspension, will frequently be sufficient to achieve a sufficiently high viscosity for the suspension. The fraction of auxiliaries can in each case be determined by simple preliminary tests.

It can be advantageous for the suspension used, which contains shutdown particles, to contain adhesion promoters. Such a suspension with adhesion promoter can be applied directly to an inorganic layer of the separator even when the layer was not hydrophobicized beforehand. It will be appreciated that a suspension with adhesion promoter can also be applied to a hydrophobicized layer or to a separator layer which has been made employing an adhesion promoter. Adhesion promoters useful in the shutdown particle suspension are preferably silanes having amino, vinyl or methacryloyl side groups. Such adhesion promoters include for example AMEO (3-aminopropyltriethoxysilane), MEMO (3-methacryloyloxypropyl-trimethoxysilane), Silfin (vinylsilane+initiator+catalyst), VTEO (vinyltriethoxysilane) or VTMO (vinyltrimethoxysilane). Such silanes are available for example from Degussa as an aqueous solution under the designation Dynasilane 2926, 2907 or 2781. An adhesion promoter fraction of not more than 10% by weight has been determined to be sufficient for ensuring sufficient adhesion of the shutdown particles to the porous inorganic layer. Shutdown particle suspensions with adhesion promoter preferably contain from 0.1% to 10% by weight, more preferably from 1% to 7.5% by weight and most preferably from 2.5% to 5% by weight of adhesion promoter, based on the suspension.

Useful shutdown particles include all particles having a defined melting point. The particle material is chosen according to the desired shutdown temperature. Since relatively low shutdown temperatures are desired for most batteries, it is advantageous to use shutdown particles selected from particles of polymers, polymer blends, natural and/or artificial waxes. Particularly preferred shutdown particles are particles of polypropylene or polyethylene wax.

The shutdown particle suspension may be applied to the porous inorganic layer of the separator by printing on, pressing on, pressing in, rolling on, knifecoating on, spreadcoating on, dipping, spraying or pouring on. The shutdown layer is preferably obtained by drying the applied suspension at a temperature from room temperature to 100° C. and preferably from 40 to 60° C.

It may be preferable for the particles to be fixed after they have been applied to the porous inorganic layer, by heating one or more times to a temperature above the glass transition temperature, so that the particles are fused on without undergoing a change in the actual shape. This makes it possible to ensure that the shutdown particles adhere particularly firmly to the porous inorganic separator layer.

The applying of the suspension with subsequent drying and any heating to above the glass transition temperature can be carried out continuously or quasicontinuously. When the starting material used is a flexible separator it can again be unwound off a roll, passed through a coating, drying and, if used, heating apparatus and then be rolled up again.

Hybrid ceramic separators according to the present invention are useful as separators in batteries, especially lithium batteries. When the separator is used according to the invention as a separator in batteries, the separator is customarily placed in electrolyte-saturated form between the anode and the cathode. All prior art electrolyte and electrode materials can be used, since the separators of the present invention are inert to all these materials and do not change, not even at elevated temperature.

The separator of the present invention is especially suitable for primary and secondary (rechargeable) lithium batteries. The separator of the present invention is particularly useful in lithium high energy batteries.

The present invention also provides batteries, especially lithium batteries and most preferably lithium high energy batteries that comprise a separator according to the present invention.

The subject matter of the present invention is illustrated by the nonlimiting embodiments of FIGS. 1 to 5.

FIG. 3 shows the pore radius distribution of an inorganic component prepared according to inventive example 1a by stirring 6 g of Aerosil 200 from Degussa into a mixture of 60 g of cyclohexane and 1.33 g of Levasil 300/30, a 30% by weight $SiO_2$ sol from Bayer AG, gelling the mixture, evaporating the solvent and completely drying and solidifying the gel at 200° C. FIG. 4 shows the pore radius distribution of an inorganic component prepared according to inventive example 1a by stirring 6 g of Aerosil 200 from Degussa into a mixture of 53 g of isopropanol and 1.33 g of Levasil 300/30, a 30% by weight $SiO_2$ sol from Bayer AG, gelling the mixture, evaporating the solvent and completely drying and solidifying the gel at 200° C. FIG. 5 shows the pore radius distribution of an inorganic component prepared according to inventive example 1a by stirring 6 g of Aerosil 200 from Degussa into a mixture of 18 g of ethanol, 18 g of water and 1.33 g of Levasil 300/30, a 30% by weight $SiO_2$ sol from Bayer AG, gelling the mixture, evaporating the solvent and completely drying and solidifying the gel at 200° C.

The nonlimiting examples which follow illustrate the present invention.

COMPARATIVE EXAMPLE 1

Production of an S450PET Separator

To 160 g of ethanol are initially added 15 g of a 5% by weight aqueous HCl solution, 10 g of tetraethoxysilane, 2.5 g of methyltriethoxysilane and 7.5 g of Glymo Dynasilane (all Dynasilanes produced by Degussa AG). This sol, which was initially stirred for some hours, is then used to suspend 125 g each of Martoxid MZS-1 and Martoxid MZS-3 aluminas from Martinswerke. This slip is homogenized with a magnetic stirrer for at least a further 24 h, during which the stirred vessel has to be covered over in order that solvent may not escape.

This slip is then used to coat a PET nonwoven about 30 μm in thickness (thinner nonwovens are very difficult to coat with these large particles without defects and holes) and about 20 g/m² in basis weight in a continuous rollercoating process at a belt speed of about 8 m/h and T=200° C. In this rollercoating process, the slip is coated onto the nonwoven using a roller turning opposite to the belt direction (the direction of movement of the nonwoven). The nonwoven subsequently passes through an oven at the stated temperature. The subsequent tests utilize the same method and arrangement. The end result obtained is a separator having an average pore size of 450 nm, a thickness of about 50 μm and a weight of about 50 g/m². The sheet resistance (measured by impedance spectroscopy and nonblocking lithium electrodes) of the separator saturated with a solution of $LiPF_6$ in EC/DMC is about 5 $\Omega cm^2$.

COMPARATIVE EXAMPLE 2

Lithium Ion Battery with Prior Art Hybrid Ceramic Separator

An S450PET separator prepared according to comparative example 1 is installed in a lithium ion cell consisting of a positive mass of $LiCoO_2$, a negative mass consisting of graphite and an electrolyte of $LiPF_6$ in ethylene carbonate/dimethyl carbonate [LiCoO2 (36.3 mg)//S-450-PET, EC/DMC 1:1, 1M $LiPF_6$ II graphite (17.0 mg)]. Battery running is stable for several hundred cycles. Owing to the fairly large internal resistance in the separator, only about 90% of the capacity of the cell can be charged with constant current.

INVENTIVE EXAMPLE 1a

Production of a Ceramic Powder from a Nanoscale Aerosil® 200

1.33 g of Levasil® 300/30, a 30% by weight $SiO_2$ sol from Bayer AG, are added to 6 g of isopropanol and 54 g of cyclohexane. This mixture is admixed with 6 g of Aerosil® 200, a pyrogenic silica from Degussa AG, by stirring. After gelling of the sol, the solvent is evaporated and the gel is completely dried and solidified at 200° C.

The material has an average pore size of 170 nm and a porosity of 83%, as measured by Hg porosimetry.

INVENTIVE EXAMPLES 1b-1u

Production of a Ceramic Powder from Nanoscale Pyrogenic Oxides

Further mixtures were prepared and analyzed as described in inventive example 1a. Table 3 hereinbelow gives an overview of the ingredients and results of the tests 1b to 1u. The ingredient ratio is based on the weight ratios of $SiO_2$ in Levasil to Aerosil.

TABLE 3

| Inventive Example | Ingredients | Ingredient ratio Levasil:Aerosil | Drying temp. ° C. | Mean pore radius nm | Porosity % |
| --- | --- | --- | --- | --- | --- |
| 1b | 1.33 g Levasil 300/30<br>16 g ethanol/H2O 1:1<br>62 g Aerosil 200 | 1:15 | 200 | 11.9 | 71.2 |
| 1c | 1.33 g Levasil 300/30<br>40 g ethanol/H2O 1:1<br>6 g Aerosil 200 | 1:15 | 200 | 10.9 | 95.7 |
| 1d | 1.33 g Levasil 300/30<br>40 g ethanol/H2O 1:1<br>6 g Aerosil 200 | 1:15 | 200 | 10.5 | 66.6 |
| 1e | 1.33 g Levasil 300/30<br>40 g ethanol<br>6 g Aerosil 200 | 1:15 | 200 | 36.4 | 79.1 |
| 1f | 1.33 g Levasil 300/30<br>40 g ethanol<br>6 g Aerosil 200 | 1:15 | 200 | 30.8 | 76.4 |
| 1g | 1.33 g Levasil 300/30<br>50 g n-butanol<br>6 g Aerosil 200 | 1:15 | 200 | 63.1 | 78.4 |
| 1h | 1.33 g Levasil 300/30<br>53 g isopropanol<br>6 g Aerosil 200 | 1:15 | 200 | 94.7 | 82.3 |
| 1i | 1.33 g Levasil 300/30<br>55 g isopropanol:acetone 1:1<br>6 g Aerosil 200 | 1:15 | 200 | 58.7 | 77.9 |

TABLE 3-continued

| Inventive Example | Ingredients | Ingredient ratio Levasil:Aerosil | Drying temp. °C. | Mean pore radius nm | Porosity % |
|---|---|---|---|---|---|
| 1k | 1.33 g Levasil 300/30<br>61 g isopropanol:cyclohexane 1:1<br>6 g Aerosil 200 | 1:15 | 200 | 97.4 | 84.2 |
| 1l | 1.33 g Levasil 300/30<br>60 g cyclohexane<br>6 g Aerosil 200 | 1:15 | 200 | 310.7 | 85.5 |
| 1m | 1.33 g Levasil 300/30<br>50 g ethanol/H2O 1:1<br>6 g Aerosil 380 | 1:15 | 200 | 7.8 | 63.8 |
| 1n | 1.33 g Levasil 300/30<br>50 g ethanol<br>6 g Aerosil 380 | 1:15 | 200 | 33 | 73 |
| 1o | 1.33 g Levasil 300/30<br>60 g isopropanol<br>6 g Aerosil 380 | 1:15 | 200 | 72.3 | 4.2 |
| 1p | 1.33 g Levasil 300/30<br>60 g cyclohexane<br>6 g Aerosil 380 | 1:15 | 200 | 656.5 | 78.6 |
| 1q | 1.33 g Levasil 300/30<br>40 g ethanol/H2O 1:1<br>6 g Aerosil 300 | 1:15 | 200 | 7.8 | 63.1 |
| 1r | 1.33 g Levasil 300/30<br>40 g ethanol/H2O 1:1<br>6 g Aerosil 300 | 1:15 | 200 | 7.6 | 59.6 |
| 1s | 1.33 g Levasil 300/30<br>40 g ethanol<br>6 g Aerosil 300 | 1:15 | 200 | 11.9 | 36.7 |
| 1t | 1.33 g Levasil 300/30<br>55 g isopropanol<br>6 g Aerosil 300 | 1:15 | 200 | 75.8 | 79 |
| 1u | 1.33 g Levasil 300/30<br>60 g cyclohexane<br>6 g Aerosil 300 | 1:15 | 200 | 740.5 | 84 |

EXAMPLE 2a

Production of an Inventive Separator for Lithium High Energy Batteries 1.33 g of Levasil® 300/30 (Bayer AG) are added to 6 g of isopropanol and 54 g of cyclohexane. This mixture is admixed with 6 g of Aerosil® 200 by stirring.

This slip is then used to coat a PET nonwoven about 13 μm in thickness and about 6 g/m$^2$ in basis weight in a continuous rollercoating process at a belt speed of about 8 m/h and T=200° C. In this rollercoating process, the slip is coated onto the nonwoven using a roller turning opposite to the belt direction (the direction of movement of the nonwoven). The nonwoven subsequently passes through an oven at the stated temperature. The end result obtained is a separator having an average pore size of 180 nm, a thickness of about 25 μm and a weight of about 15 g/m$^2$. The sheet resistance (measured by impedance spectroscopy and nonblocking lithium electrodes) of the separator saturated with a solution of LiPF$_6$ in EC/DMC is about 1.5 Ωcm$^2.$ The tests hereinbelow employ the same method and arrangement as inventive example 2a.

INVENTIVE EXAMPLES 2b-2u

Production of an Inventive Separator for Lithium High Energy Batteries

The mixtures known from inventive examples 1 b-1 u can be used as per the description in inventive example 2a to produce separators based on the thin 13 μm PET nonwoven. The end results obtained are separators having an average pore size which is comparable to the values mentioned in inventive examples 1 b-1 u and which have thicknesses of about 25 μm and basis weights of about 15 g/m$^2.$

INVENTIVE EXAMPLE 3

Lithium Ion Battery with Inventive Hybrid Ceramic Separator

A separator prepared according to inventive example 2a is installed in a lithium ion cell consisting of a positive mass of LiCoO$_2$, a negative mass consisting of graphite and an electrolyte of LiPF$_6$ in ethylene carbonate/dimethyl carbonate [LiCoO2 (36.3 mg)//S-450-PET, EC/DMC 1:1, 1M LiPF$_6$// graphite (17.0 mg)]. Battery running is stable for several hundred cycles. Owing to the distinctly lower internal resistance in the separator, virtually the entire capacity of the cell can be charged with constant current. Owing to the thinner separator and the lower basis weight, not only the mass-based but also the volume-based specific energy density is distinctly above that of comparative example 2.

The invention claimed is:

1. A separator especially for lithium high energy batteries, comprising a sheetlike flexible substrate having a multiplicity of openings and having a porous inorganic coating on and in said substrate, the material of said substrate being selected from a nonwoven of electrically nonconductive polymeric fibers, wherein the separator has a weight of less than 50 g/m$^2$ and a thickness of less than 35 μm and in that the porous inorganic coating is constructed from oxide particles having a primary particle size of from 5 to 100 nm and adhered via SiO$_2$ or ZrO$_2$, wherein the coating is prepared from a sol or suspension comprising a solvent which comprises a mixture of at least one alcohol and at least one hydrocarbon.

2. The separator of claim 1, wherein said separator has a weight of less than 20 g/m².

3. The separator of claim 1 wherein said polymeric fibers are selected from fibers of polyacrylonitrile, polyester and/or polyolefin.

4. The separator of claim 1 wherein said polymeric fibers are from 0.1 to 10 μm in diameter.

5. The separator of claim 1 wherein said flexible substrate has a porosity of from 50% to 97%.

6. The separator of claim 1 wherein said flexible substrate is less than 30 μm in thickness.

7. The separator of claim 6, wherein said nonwoven is less than 20 g/m² in weight.

8. The separator of claim 1 wherein said coating on and in said substrate comprises an oxide of the metals Al, Zr and/or Si.

9. The separator of claim 1 wherein said separator has a porosity of from 30% to 80%.

10. The separator of claim 1 wherein said separator has a breaking strength of more than 1 N/cm.

11. The separator of claim 1 wherein said separator is bendable around a radius down to 50 mm without damage.

12. The separator of claim 1 wherein said separator is bendable around a radius down to 0.5 mm without damage.

13. A process for producing a separator as claimed in claim 1 wherein said process comprises providing a sheetlike flexible substrate having a multiplicity of openings with a coating on and in said substrate, the material of said substrate being selected from nonwovens less than 30 μm in thickness of electrically nonconductive fibers of polymers and said coating being a porous electrically insulating ceramic coating which is prepared by applying a suspension to said substrate and heating one or more times to solidify said suspension on and in said substrate, the suspension being obtained by suspending metal oxide particles of at least one oxide of the elements Al, Zr and/or Si, which have a primary particle size of from 5 to 100 nm, in a sol of at least one of the elements Si and/or Zr.

14. The process of claim 13, wherein said fibers are selected from the group consisting of polyacrylonitrile, polyester, polyolefin and mixtures thereof.

15. The process of claim 13 wherein said suspension is brought onto and into said substrate by printing, pressing, rolling, knifecoating, spreadcoating, dipping, spraying or pouring.

16. The process of claim 13 wherein said sol is prepared by hydrolyzing at least one alkoxide compound of the elements Zr, Al and/or Si or at least one nitrate, carbonate or halide of the elements Zr, Al and/or Si.

17. The process of claim 13 wherein metal oxide particles having an average primary particle size of from 7 to 50 nm are suspended.

18. The process of claim 13 wherein the mass fraction of said suspended component is from 1 to 100 times that of the sol used.

19. The process of claim 13 wherein said suspension present on and in said support is solidified by heating at from 150 to 500° C.

20. The process of claim 19, wherein said heating is effected at from 200 to 280° C. for from 0.5 to 10 minutes.

21. A battery comprising a separator as claimed in claim 1.

22. The battery as claimed in claim 21 wherein said battery is a lithium high energy battery.

23. A method of separating components in a battery comprising utilizing the separator as claimed in claim 1.

24. The method as claimed in claim 23 wherein said battery is a lithium battery.

25. The separator of claim 1 wherein the solvent comprises (1) at least one of methanol, ethanol and propanol, and (2) cyclohexane.

* * * * *